United States Patent [19]

Chakravarti et al.

[11] 4,381,640

[45] May 3, 1983

[54] PROCESS FOR THE PRODUCTION OF REINFORCED RUBBER ARTICLES

[75] Inventors: Kalidas Chakravarti, Richmond; Stanley D. Lazarus, Petersburg, both of Va.

[73] Assignee: Allied Corporation, Morris Township, N.J.

[21] Appl. No.: 207,493

[22] Filed: Nov. 17, 1980

[51] Int. Cl.³ .......................... D02G 3/02; D02G 3/36
[52] U.S. Cl. ........................................ 57/242; 57/295; 57/297; 57/902; 427/387; 428/391; 428/395; 523/222; 523/511; 523/521; 524/265; 524/604; 524/605
[58] Field of Search ................. 57/241, 242, 902, 295; 523/222, 511, 521; 524/265, 604, 605; 427/387; 428/391, 395

[56] References Cited

U.S. PATENT DOCUMENTS

| | | | |
|---|---|---|---|
| 3,672,977 | 6/1972 | Constantino | 204/55 R |
| 3,730,892 | 5/1973 | Marshall et al. | 252/8.75 |
| 3,778,406 | 12/1973 | Klotzer et al. | 260/41.5 A |
| 3,814,627 | 6/1974 | Marshall et al. | 117/138.8 F |
| 3,917,893 | 11/1975 | Marshall et al. | 117/139.5 A |
| 3,929,180 | 12/1975 | Kawase et al. | 57/902 |
| 4,054,634 | 10/1977 | Marshall et al. | 264/210 F |

FOREIGN PATENT DOCUMENTS 1230982  5/1971  United Kingdom .

Primary Examiner—J. Ziegler
Attorney, Agent, or Firm—Virginia S. Andrews

[57] ABSTRACT

A process for the production of reinforced rubber articles formed from polyester yarn embedded into rubber stock is disclosed. The process comprises the steps of: (1) treating the yarn with a finish composition which comprises water and a silane having the structural formula:

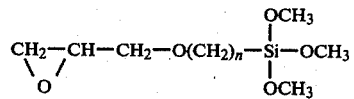

wherein n=2 to 5, and (2) including from about 2 to 50 parts, per hundred parts of rubber, of silica particles in the rubber stock. The reinforced rubber article is preferably a pneumatic passenger tire which has excellent adhesion of tire cord to rubber.

11 Claims, No Drawings

PROCESS FOR THE PRODUCTION OF REINFORCED RUBBER ARTICLES

BACKGROUND OF THE INVENTION

1. Field of the Invention

The present invention relates to a process for the production of reinforced rubber articles. More particularly, the present invention relates to a process for the production of reinforced rubber articles formed from polyester, more preferably polyethylene terephthalate, yarn embedded into a rubber stock, wherein the yarn is coated with an aqueous emulsion which contains an epoxy silane, and wherein silica particles are included in the rubber stock. The present invention also relates to reinforced rubber articles produced in accordance with the process. The preferred reinforced rubber articles are pneumatic passenger tires which have excellent adhesion of tire cord to rubber.

2. Description of the Prior Art

Polyester tire cord requires the application of an adhesive layer to obtain bonding to the rubber. Two types of adhesive systems, a single dip and a double dip adhesive system, have been developed to meet this need.

In the double dip system, polyester cords are treated with a first dip which is a dispersion of a phenol-blocked methylene bis-phenylene diisocyanate, an epoxy resin, wetting agents and water. The treated cord is cured, then treated with a second dip of resorcinolformaldehyde-latex and cured again.

In the single dip system, an adhesive is incorporated in either a spin finish or an overfinish for application to the polyester yarn. The polyester yarn is plied and/or twisted into cords which are treated with a resorcinolformaldehyde-latex dip and cured. The need for the blocked diisocyanate dip in cord processing is eliminated by this system. Low carboxyl polyester yarn treated with this system has very good ammonolytic and hydrolytic stability, but has poor adhesion to rubber when made into tire cord. Further, while regular carboxyl polyester yarn shows acceptable adhesion to rubber under normal curing temperatures, a reduction of the curing temperatures has been found to adversely affect adhesion to rubber.

The present invention significantly improves yarn to rubber adhesion of polyester tire cords treated with the single dip system for (a) low carboxyl polyester yarn wherein normal dip curing temperatures are utilized, and (b) regular carboxyl polyester yarn wherein reduced dip curing temperatures are utilized.

The closest prior art is believed to be U.S. Pat. No. 3,672,977 to Dardoufas, 3,730,892 to Marshall et al., 3,778,406 to Klotzer et al. and British Patent Specification 1,230,982 to Jervis et al.

SUMMARY OF THE INVENTION

The present invention provides a process for the production of reinforced rubber articles formed from polyester yarn embedded in rubber stock. The present invention further provides reinforced rubber articles produced in accordance with the process.

The process comprises the steps of:

(1) treating the yarn with a finish composition which comprises water and a silane having the structural formula:

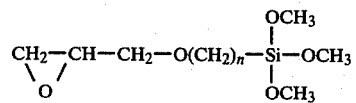

wherein n=2 to 5, and (2) including from about 2 to 50, more preferably 4 to 25, parts per hundred parts of rubber of silica particles in the rubber stock.

The finish composition may comprise about 50 to 98 weight percent of water and about 2 to 50 weight percent of the silane. When these form the major finish composition ingredients and the finish composition is to be applied by means of a conventional lube roll, it is preferred that a small amount, for example 0.1 weight percent, of a non-ionic wetting agent be incorporated in order to wet the lube roll; Triton-X-100, Rohm & Haas Company's trade name for polyoxyethylene 9-10 octyl phenol is satisfactory.

It is preferred that the finish composition be an overfinish composition which comprises an oil-in-water emulsion wherein the non-aqueous portion comprises about 50 to 70 weight percent of hexadecyl stearate, about 3 to 9 weight percent of glycerol monooleate, about 2 to 8 weight percent of decaglycerol tetraoleate, about 5 to 12 weight percent of ethoxylated tall oil fatty acid, about 5 to 15 weight percent of sulfonated glycerol trioleate, about 1 to 10 weight percent of ethoxylated alkyl amine, and about 2 to 45 weight percent of the silane. The preferred silane is gamma-glycidoxypropyltrimethoxysilane. The yarn is preferably treated with a sufficient amount of the overfinish composition that (a) about 0.4 to 2.0 weight percent based on the weight of the yarn of the non-aqueous portion of the overfinish composition is added, and (b) about 0.05 to 0.2 weight percent based on the weight of the yarn of the silane is added. Alternatively, the overfinish composition can comprise about 7 to 50 weight percent of the silane, about 5 to 20 weight percent of dimethyl polysiloxane emulsion, and the balance water.

It is preferred that the silica particles be finer than 225 mesh with an ultimate particle size of about 0.02 micron. It is also preferred that the silica particles be hydrated.

The present invention also provides a process for the production of reinforced rubber articles formed from polyester yarn twisted into cord and embedded into rubber stock. The process steps comprise: (1) treating the yarn with an overfinish composition comprising about 60 to 90 weight percent of water and about 10 to 40 weight percent of an oil portion, the oil portion comprising about 50 to 70 weight percent of hexadecyl stearate, about 3 to 9 weight percent of glycerol monooleate, about 2 to 8 weight percent of decaglycerol tetraoleate, about 5 to 12 weight percent of ethoxylated tall oil fatty acid, about 5 to 15 weight percent of sulfonated glycerol trioleate, about 1 to 10 weight percent of ethoxylated alkyl amine, and about 2 to 45 weight percent of a silane having the structural formula:

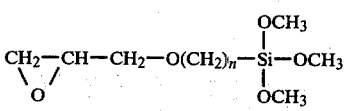

wherein n=2 to 5; and (2) including from about 4 to 25 parts per hundred parts of rubber of hydrated silica particles having a mesh size finer than 225 mesh and an ultimate particle size of about 0.2 micron in the rubber stock.

Low carboxyl polyester yarn is defined as having about 8 to 18 carboxyl end groups (meq./kg.). Regular carboxyl polyester yarn is defined as having about 19 to 30 carboxyl end groups (meq./kg.).

The strip adhesion test utilized in illustrating the present invention is defined in U.S. Pat. No. 3,940,544 to Marshall et al. (hereby incorporated by reference).

DESCRIPTION OF THE PREFERRED EMBODIMENT

In order to demonstrate the invention, the following examples are given. They are provided for illustrative purposes only and are not to be construed as limiting the scope of the invention, which is defined by the appended claims. Sepcifically, it is believed that the finish composition can be applied either as a spin finish during spinning or as an overfinish subsequent to drawing of the yarn. Further, it is believed that there are other spin finishes which would perform as satisfactorily as the one detailed (see Table I). It is also believed that there are other compatible non-aqueous components which would perform as satisfactorily in the overfinish composition as the ones detailed as additional to the silane. In these examples, parts and percentages are by weight unless specified otherwise.

The yarns utilized in this invention can be processed by any spin draw process or spinning and separately drawing process available to the art and the patent and technical literature, using any suitable polyester.

The preferred polyesters are the linear terephthalate polyesters, i.e., polyesters of a glycol containing from 2 to 20 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4,4'-dibenzoic acid, or 2,8-di-benzofuran-dicarboxylic acid. The glycol may contain more than two carbon atoms in the chain, e.g., diethylene glycol, butylene glycol, decamethylene glycol, and 1,4-bis(hydroxymethyl)cyclohexane. Examples of linear terephthalate polyesters which may be employed include poly(ethylene terephthalate), poly(butylene terephthalate), poly(ethylene terephthalate/5-chloroisophthalate) (85/15), poly(ethylene terephthalate/5-[sodium sulfo]isophthalate) (97/3), poly(cyclohexane-1,4-dimethylene terephthalate), and poly(cyclohexane-1,4-dimethylene terephthalate/hexahydroterephthalate) (75/25).

TABLE I

SPIN FINISH COMPOSITION (PERCENT BY WEIGHT)

| Components | A | B | C | D |
|---|---|---|---|---|
| Isohexadecyl stearate | 15 | — | 30 | — |
| Refined coconut oil | 15 | 30 | — | — |
| POE(4)* lauryl ether | 13 | 13 | 13 | 10 |
| Sodium salt of alkylarylsulfonate | 10 | 10 | 10 | 10 |
| POE(20)* tallow amine | 5 | 5 | 5 | 5 |
| Nekal WS-25** | 2 | 2 | 2 | — |
| Mineral oil | 40 | 40 | 40 | 40 |
| C$_8$–C$_{10}$ blended fatty acid ester of pentaerythritol | — | — | — | 30 |
| Aerosol OT-S*** | — | — | — | 5 |

*Moles of ethylene oxide per mole of base material.
**GAF's trade name for solution consisting of 75 percent sodium dinonyl sulfosuccinate, 10 percent isopropanol, and 15 percent water.
***American Cyanamid's trade name for solution consisting of 70 percent sodium dioctyl sulfosuccinate and 30 percent petroleum distillate.

TABLE II

OVERFINISH COMPOSITIONS (PERCENT BY WEIGHT)

| Component | A | B | C |
|---|---|---|---|
| Isohexadecyl stearate | 19.5 | 18.7 | — |
| Glycerol monooleate | 1.8 | 1.7 | — |
| Decaglycerol tetraoleate | 1.5 | 1.4 | — |
| POE(15)* tall oil fatty acid | 2.4 | 2.3 | — |
| Sulfonated glycerol trioleate | 3.6 | 3.5 | — |
| POE(20)* tallow amine | 1.2 | 1.2 | — |
| Gamma-glycidoxypropyl-trimethoxysilane | — | 4.0 | 10 |
| Water | 70.0 | 67.2 | 80 |
| Dimethyl polysiloxane emulsion** | — | — | 10 |

*Moles of ethylene oxide per mole of base material.
**SWS 232, obtainable from SWS Corporation, Adrian, Michigan 49221.

TABLE III

SINGLE DIP* TREATING CONDITIONS

| Condition | Drying Temperature (°C.) | Drying Temperature (°F.) | Drying Exposure (seconds) | Curing Temperature (°C.) | Curing Temperature (°F.) | Curing Exposure (seconds) |
|---|---|---|---|---|---|---|
| 1 | 149 | 300 | 80 | 218 | 425 | 60 |
| 2 | 149 | 300 | 80 | 241 | 465 | 60 |

*Non-ammoniated RFL dip at 4.0 to 5.0 percent total solids pickup based on the weight of the cord, and 1 percent stretch.

TABLE IV

RUBBER STOCK COMPOSITIONS

| Component | Control | Composition 1 | Composition 2 |
|---|---|---|---|
| Natural Rubber | 67 | 67 | 67 |
| Styrene-butadiene rubber | 18 | 18 | 18 |
| E-BR 8411$^a$ | 30 | 30 | 30 |
| Hi-Sil 233$^b$ | 0 | 5.7 | 28.7 |
| Carbon Black (N-650) | 50 | 44.3 | 21.3 |
| Zinc Oxide | 3.5 | 3.5 | 3.5 |
| Surfactol 4240$^c$ | 6.5 | 6.5 | 6.5 |
| Stearic Acid | 2.0 | 2.0 | 2.0 |
| Pine Rar | 2.5 | 2.5 | 2.5 |
| AROFENE 8318$^d$ | 1.0 | 1.0 | 1.0 |
| Diphenyl Guanidine | 0.1 | 0.1 | 0.1 |
| MBTS$^e$ | 0.5 | 0.5 | 0.5 |
| Sulphur | 2.3 | 2.3 | 2.3 |
| SANTOGUARD PVI$^f$ | 0.1 | 0.1 | 0.1 |
| N—oxydiethylene-2-benzothiazole sulfenamide | 0.8 | 0.8 | 0.8 |

$^a$Styrene-Butadiene Rubber emulsion from Texas - U.S. Chemical.
$^b$Precipitated, hydrated silica supplied by Harwick Chemicals and having a specific gravity of 2 and an ultimate particle size of 0.02 micron, and being finer than 225 mesh.
$^c$Trademark of Baker Castor Oil Co. for a castoroil derived nonionic surfactant.
$^d$Ashland Chemical's trade name for octylphenyl formaldehyde.
$^e$Trade designation for 2,2'-dibenzothiazolyl disulfide.
$^f$Monsanto Chemical Company's trade name for (N—cyclohexyl thio)-phthalamide.

TABLE V

| Example | COOH End Groups | Spin Finish[1] | Over-Finish[2] | Treating Conditions[3] | Rubber Composition[4] | Adhesion[5] Pounds Pull | Adhesion[5] Visual Rating |
|---|---|---|---|---|---|---|---|
| 1 | 11 | A | A | 2 | Control | 27 | 3.0 |
| 2 | 11 | A | A | 2 | 1 | 30 | 3.0 |
| 3 | 11 | A | A | 2 | 2 | 31 | 3.9 |
| 4 | 11 | A | B | 2 | Control | 30 | 3.9 |
| 5 | 11 | A | B | 2 | 1 | 36 | 3.9 |
| 6 | 11 | A | B | 2 | 2 | 35 | 4.5 |
| 7 | 24 | A | A | 1 | Control | 26 | 2.0 |
| 8 | 24 | A | A | 1 | 1 | 30 | 2.5 |
| 9 | 24 | A | A | 1 | 2 | 30 | 3.0 |
| 10 | 24 | A | B | 1 | Control | 27 | 2.0 |
| 11 | 24 | A | B | 1 | 1 | 28 | 4.0 |
| 12 | 24 | A | B | 1 | 2 | 36 | 4.4 |
| 13 | 24 | A | B | 2 | Control | 30 | 4.2 |
| 14 | 24 | A | B | 2 | 1 | 34 | 4.6 |
| 15 | 24 | A | B | 2 | 2 | 38 | 4.8 |

[1] See Table I.
[2] See Table II.
[3] See Table III.
[4] See Table IV.
[5] Tested at 250° F. (121° C.).

EXAMPLE 1 (Comparative)

For comparative testing, a polyethylene terephthalate yarn having 11 carboxyl end groups was treated substantially in accordance with one procedure described in U.S. Pat. No. 3,672,977 to Dardoufas, hereby incorporated by reference, i.e., a 1,000 denier, 192 filament yarn was prepared comprised of polyethylene terephthalate filaments treated with about 0.45 percent based on the weight of the yarn of a liquid spin finish identified as Spin Finish A in Table I. Drawing performance of the yarn was excellent. Finish oil on the fiber was about 0.15 to 0.25 percent.

To this yarn a secondary finish or overfinish, identified as Overfinish A of Table II, was applied at a 3 percent total wet pickup to achieve a total oil on yarn level of about 1.0 percent. The yarn was then twisted into 3-ply cords having 9×9 twists per inch. Each cord was treated with a conventional, non-ammoniated resorcinol-formaldehyde-latex dip comprising vinylpyrridine latex, resorcinol, formaldehyde, sodium hydroxide and water, at about 4.5 percent total solids pickup based on the weight of the cord. The cords were then cured at treating condition 2 of Table III.

The cords were bonded to the rubber stock composition identified as the control in Table IV by vulcanizing the rubber composition for 6 minutes at 176° C. (350° F.) at 334 pounds per square inch (2302 kilopascals). The resulting reinforced rubber article was subjected to the strip adhesion test, results of which are presented in Table V.

EXAMPLES 2-3

The procedure of Example 1 was repeated in Examples 2 and 3 with the following changes: The rubber stock compositions identified as 1 and 2 of Table IV were utilized in, respectively, Examples 2 and 3. Results of adhesion testing are presented in Table V.

EXAMPLE 4-6

The procedure of Example 1 was repeated in each of Examples 4-6 with the following changes: In all of the examples the yarn was overfinished with Overfinish B of Table II. The rubber stock compositions identified as the Control, 1 and 2 of Table IV were utilized in, respectively, Examples 4, 5, and 6. Results of adhesion testing are presented in Table V.

EXAMPES 7-15

Polyethylene terephthalate yarn having 24 carboxyl end groups (regular carboxyl polyethylene terephthalate) was prepared in accordance with the procedure of Example 1 in each of Examples 7-15 utilizing the spin finish, overfinish, treating conditions and rubber composition specified in Table V. Results of adhesion testing are also presented in Table V.

CONCLUSIONS

A comparison of Examples 1-6 shows the critical importance to adhesion for low carboxyl polyethylene terephthalate yarn of both treating the yarn with an aqueous finish composition containing an epoxy silane as previously described and embedding the yarn (cord) in a rubber stock composition containing silica. The adhesion rating for Examples 1-3 progressively improved as the amount of silica in the rubber stock composition was increased. Note, however, the marked improvement in adhesion ratings for Examples 4-6 where the overfinish composition containing the epoxy silane was used as compared with, respectively, Examples 1-3 were the overfinish composition containing the epoxy silane was not used. The adhesion ratings were especially excellent in Example 6.

A comparison of Examples 7-15 shows the critical importance to adhesion for regular carboxyl polyethylene terephthalate yarn of both treating the yarn with an aqueous finish composition containing an epoxy silane as previously described and embedding the yarn (cord) in a rubber stock composition containing silica. Further, it can be seen that substantially lower curing temperatures (treating conditions of Table III) can be utilized with the regular carboxyl yarn; this results in both energy savings and reduced plant emissions.

Note that the overfinish pickup can vary from 0.3 to 2.0 percent on the weight of the yarn. Also, vulcanization time and temperature may be varied depending on the properties desired in the resulting product.

It is theorized that the bonding between the yarn (cord) and the rubber stock composition takes place between an active functional group of silane on the polyethylene terephthalate surface and the silanol group formed on the rubber stock composition via diffusion through the resorcinolformaldehyde-latex dip.

What is claimed is:
1. In a process for the production of reinforced rubber articles formed from polyester yarn twisted into cord and embedded into rubber stock, the steps comprising:
treating the yarn with an overfinish composition comprising about 60 to 90 weight percent of water and about 10 to 40 weight percent of an oil portion, the oil portion comprising about 50 to 70 weight percent of hexadecyl stearate, about 3 to 9 weight percent of glycerol monooleate, about 2 to 8 weight percent of decaglycerol tetraoleate, about 5 to 12 weight percent of ethoxylated tall oil fatty acid, about 5 to 15 weight percent of sulfonated glycerol trioleate, about 1 to 10 weight percent of ethoxylated alkyl amine, and about 2 to 45 weight percent of a silane having the structural formula:

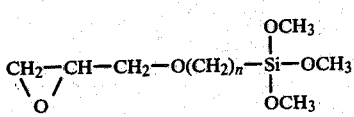

wherein n=2 to 5; and
including from about 4 to 25 parts per hundred parts of rubber of hydrated silica particles in the rubber stock.

2. The process of claim 1 wherein the silane is gamma-glycidoxypropyltrimethoxysilane.

3. A reinforced rubber article produced in accordance with the process of claim 1.

4. The process of claim 1 wherein the yarn is a regular carboxyl yarn and wherein the yarn is cured at a temperature of less than 465° F. (241° C.).

5. The process of claim 4 wherein the curing temperature is at least 425° F. (218° C.).

6. The process of claim 1 wherein the yarn is a low carboxyl yarn and wherein the yarn is cured at a temperature of at least 465° F. (241° C.).

7. In a process for the production of reinforced rubber articles formed from polyester yarn embedded into rubber stock, the steps comprising:

treating the yarn with a finish composition which comprises water and a silane having the structural formula

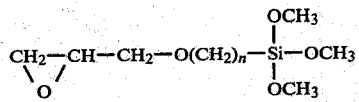

wherein n=2 to 5;
twisting the yarn into cord after the treating step; and including from about 2 to 50 parts per hundred parts of rubber of silica particles in the rubber stock.

8. The process of claim 7 wherein from about 4 to 25 parts per hundred parts of rubber of silica particles are included in the rubber stock.

9. The process of claim 7 wherein the yarn is a regular carboxyl yarn and wherein the yarn is cured at a temperature of less than 465° F. (241° C.).

10. The process of claim 9 wherein the curing temperature is at least 425° F. (218° C.).

11. The process of claim 7 wherein the yarn is a low carboxyl yarn and wherein the yarn is cured at a temperature of at least 465° F. (241° C.).

* * * * *